(12) United States Patent
Ito

(10) Patent No.: US 6,658,214 B1
(45) Date of Patent: Dec. 2, 2003

(54) OPTICAL SPACE TRANSMISSION APPARATUS AND INFORMATION TRANSMISSION METHOD

(75) Inventor: Yujiro Ito, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/344,137

(22) Filed: Jun. 24, 1999

(30) Foreign Application Priority Data

Jul. 6, 1998 (JP) .......................................... 10-189982

(51) Int. Cl.[7] .............................................. H04B 10/00
(52) U.S. Cl. ........................ 398/120; 398/129; 398/131
(58) Field of Search ................................ 359/172, 142, 359/159; 398/120, 129, 131

(56) References Cited

U.S. PATENT DOCUMENTS 4,987,567 A * 1/1991 Buhrer ........................... 370/3
5,822,099 A * 10/1998 Takamatsu .................. 359/153
5,966,229 A * 10/1999 Dodley et al. .............. 359/187
6,160,652 A * 12/2000 Nir .............................. 359/138
6,181,450 B1 * 1/2001 Dishman et al. ............ 359/124
6,239,888 B1 * 5/2001 Willebrand ................. 359/118
6,285,481 B1 * 9/2001 Palmer ........................ 359/159

* cited by examiner

Primary Examiner—Chi Pham
Assistant Examiner—Shi K. Li
(74) Attorney, Agent, or Firm—Bell, Boyd & Lloyd LLC

(57) ABSTRACT

The invention provides an optical space transmission apparatus which is applied for communication of information using a light beam which propagates in the space and can reduce the frequency of replacement of a light emitting element while the construction is simple. An information signal of an operation condition which relates to transmission of a communication light beam or reception of a reception light beam is communicated with another optical space transmission apparatus together with an information signal so that the transmission side apparatus can grasp a result of reception of the light beam by the reception side apparatus and send out the light beam with a suitable light amount.

11 Claims, 12 Drawing Sheets

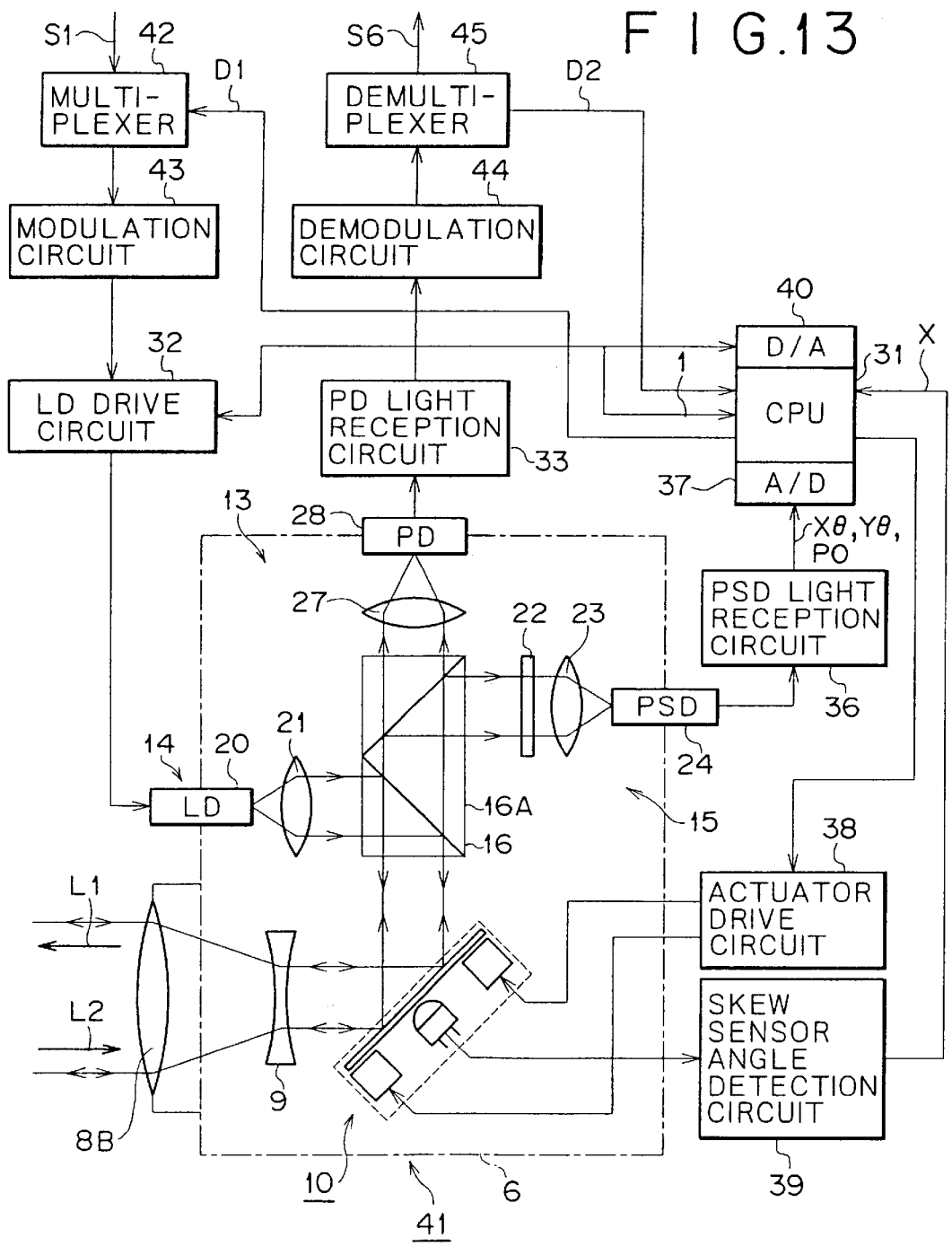
F I G. 13

OPTICAL SPACE TRANSMISSION APPARATUS AND INFORMATION TRANSMISSION METHOD

BACKGROUND OF THE INVENTION

This invention relates to an optical space transmission apparatus and an information transmission method for the optical space transmission apparatus, and more particularly to an optical space transmission apparatus for use to send and receive desired information using a light beam which propagates in the space. The present invention provides an optical space transmission apparatus wherein information of an operation condition is transmitted together with an information signal between transmission-side and reception-side apparatuses so that a light reception result of the light reception side of a light beam is grasped by the transmission side and the light beam is sent out with an appropriate light amount thereby to reduce the frequency of replacement of a light emitting element with a simple construction.

Conventionally, an optical space transmission apparatus sends or receives desired information to or from an apparatus of a similar type located, for example, on the roof of a building using a light beam emitted from the optical space transmission apparatus or the apparatus of the similar type and propagating in the space.

An optical space transmission apparatus of the type described can transmit or receive an information signal over a broad band by modulating a laser beam and can achieve communication with a high degree of secrecy without subject to control of the Wireless Telegraphy Act or a like law.

However, although an optical space transmission apparatus of the type described can be installed simply and readily and can assure a channel, it has the possibility that the channel may be interrupted if the attenuation of the transmission path is increased by fog, rain or the like. Therefore, an optical space transmission apparatus of the type sends out a laser beam with a large amount of light so that, even if the attenuation of the transmission path increases in this manner, the laser beam may be received with a sufficient amount of light by an apparatus of an object of communication.

However, where a laser beam is sent out with a large amount of light in this manner, a high load is imposed on a light emitting element as much, and it is necessary to replace the light emitting element frequently. Particularly where an information signal to be transmitted is a broad band signal whose transfer rate is higher than 100 Mbps, it cannot be avoided using a laser diode having a high modulation allowing frequency as a light emitting element, and in this instance, as the amount of emitted light increases, the life of the light emitting element decreases significantly. Incidentally, an optical space transmission apparatus may possibly be installed on the roof of a building or a like place from which an apparatus of an object of communication can be overlooked. Therefore, it is desired that the frequency of a maintenance operation for the light emitting element such as replacement be decreased as far as possible.

It seems a promising idea, for example, to cool such a light emitting element as described above by means of a Peltier device or the like while the light emitting element is used to prolong the life of the light emitting device. However, this complicates the construction of the apparatus.

SUMMARY OF THE INVENTION

It is an object of the present invention to provide an optical space transmission apparatus which can reduce the frequency of replacement of a light emitting element while the construction is simple.

In order to attain the object described above, according to the present invention, in an optical space transmission apparatus, information regarding an operation condition which relates to transmission of a transmission light beam or reception of a reception light beam is communicated with another optical space transmission apparatus together with an information signal.

More particularly, according to an aspect of the present invention, there is provided an optical space transmission apparatus comprising a send means for sending out a transmission light beam modulated with a predetermined information signal to another optical space transmission apparatus disposed in a spaced relationship by a predetermined distance from the optical space transmission apparatus, a reception means for receiving a transmission light beam sent out from another optical space transmission apparatus in a spaced relationship by a predetermined distance from the optical space transmission apparatus as a reception light beam and a transmission means for transmitting information of an operation condition relating to reception of the reception light beam together with the information signal to another optical space transmission apparatus.

According to another aspect of the present invention, there is provided an information transmission method for an optical space transmission apparatus comprising the steps of sending out a transmission light beam modulated with a predetermined information signal to another optical space transmission apparatus disposed in a spaced relationship by a predetermined distance from the optical space transmission apparatus, receiving a transmission light beam sent out from another information space transmission apparatus disposed in a spaced relationship by a predetermined distance from the optical space transmission apparatus as a reception light beam and transmitting information of an operation condition relating to reception of the reception light beam together with the information signal to another optical space transmission apparatus.

Since an information signal of an operation condition which relates to transmission of a transmission light beam or reception of a reception light beam is communicated between the optical space transmission apparatuses together with an information signal, the transmission side one of the optical space transmission apparatuses can grasp an operation condition of the reception side one of the optical space transmission apparatuses and send out the transmission light beam with a suitable light amount. Consequently, the transmission light beam can be prevented from being sent out with an excessively large light amount from a light emitting element. Consequently, the burden to the light emitting element can be moderated as much and the frequency of replacement of the light emitting element can be reduced with a simple construction.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 13 is a block diagram showing another optical space transmission apparatus to which the present invention is applied.

DESCRIPTION OF THE PREFERRED EMBODIMENTS

1. First Embodiment 1-1. Construction of the First Embodiment

Figure 2:
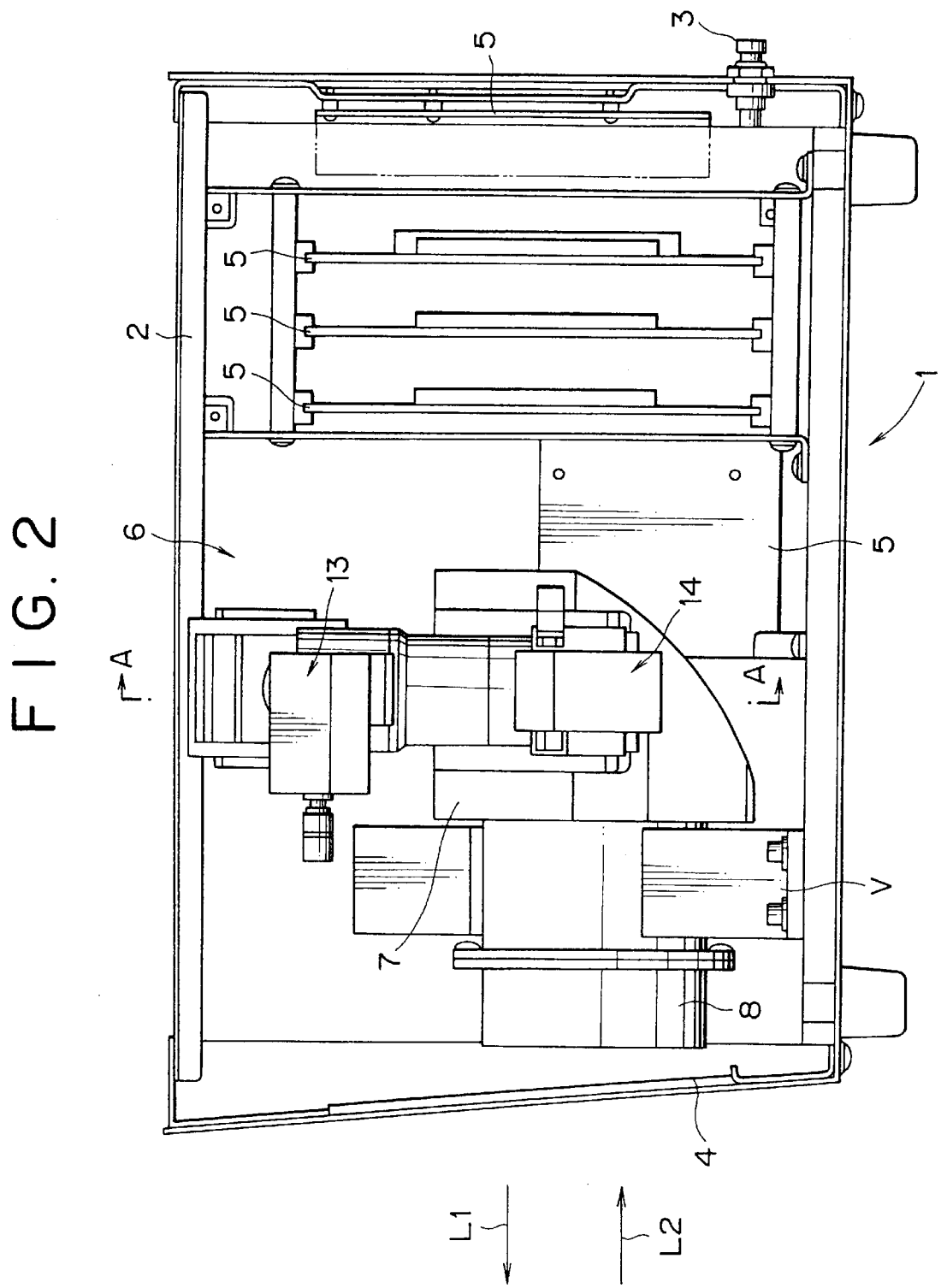
FIG. 2 is a side elevational view showing the optical space transmission apparatus to which the present invention is applied.

FIG. 2 shows an optical space transmission apparatus to which the present invention is applied. Referring to FIG. 2, the optical space transmission apparatus is disposed on the roof of a building in an opposing relationship to another optical space transmission apparatus having a similar construction, that is, an apparatus of an object of communication (hereinafter referred to as communication object apparatus). The optical space transmission apparatus generally denoted at 1 sends out a light beam (hereinafter referred to as transmission light beam) L1 toward the communication object apparatus and receives another light beam (hereinafter referred to as reception light beam) L2 sent out from the communication object apparatus to communicate various information signals with the communication object apparatus.

The optical space transmission apparatus 1 includes a housing 2 in which all of the components are accommodated. The optical space transmission apparatus 1 receives power supply through a connector 3 disposed on a back wall of the housing 2. Further, an information signal to be transmitted is inputted to and outputted from the optical space transmission apparatus 1 through the connector 3. It is to be noted that the information signal here is an ethernet signal.

The housing 2 has an opening formed in a front wall thereof, and the opening is covered with a transparent cover glass plate 4. The optical space transmission apparatus 1 emits a transmission light beam L1 through the cover glass plate 4 and receives a reception light beam L2 through the cover glass plate 4. The cover glass plate 4 is disposed in an inclined relationship such that the lower end thereof is positioned on the inner side with respect to the upper end thereof in order to prevent a transmission light beam from being reflected regularly and returning to the optical system. Further, the inclined arrangement of the cover glass plate 4 decreases an amount of dust, water drops or some other foreign articles sticking to the surface of the cover glass plate 4 thereby to reduce the loss of the transmission light beam L1 or the reception light beam L2 by such dust or the like.

The inside of the housing 2 is divided into two regions, that is, forward and rearward regions, and circuit boards 5 of the optical space transmission apparatus 1 are disposed in the rearward region. Further, an optical system 6 is disposed in the forward region of the housing 2.

The optical system 6 sends out the transmission light beam L1 toward the communication object apparatus, and receives the reception light beam L2 coming from the communication object apparatus and outputs a result of the light reception. The optical system 6 is formed such that a barrel having a substantially circular cross section extends from rearward of the cover glass plate 4 to the rear wall side (the portion is hereinafter referred to as free end side portion) and then is bent by 90 degrees and extends upwardly (the upward extending portion bent from the free end side portion is hereinafter referred to as optical module side portion). Further, the optical module side portion of the optical system 6 extends along a diagonal line of the housing 2 as viewed from the cover glass plate 4 side (refer to FIG. 4 which is a sectional view taken along line A—A of FIG. 2). Consequently, the optical space transmission apparatus 1 can be reduced in overall configuration thereof making use of the internal space of the housing 2 effectively.

Figure 3:
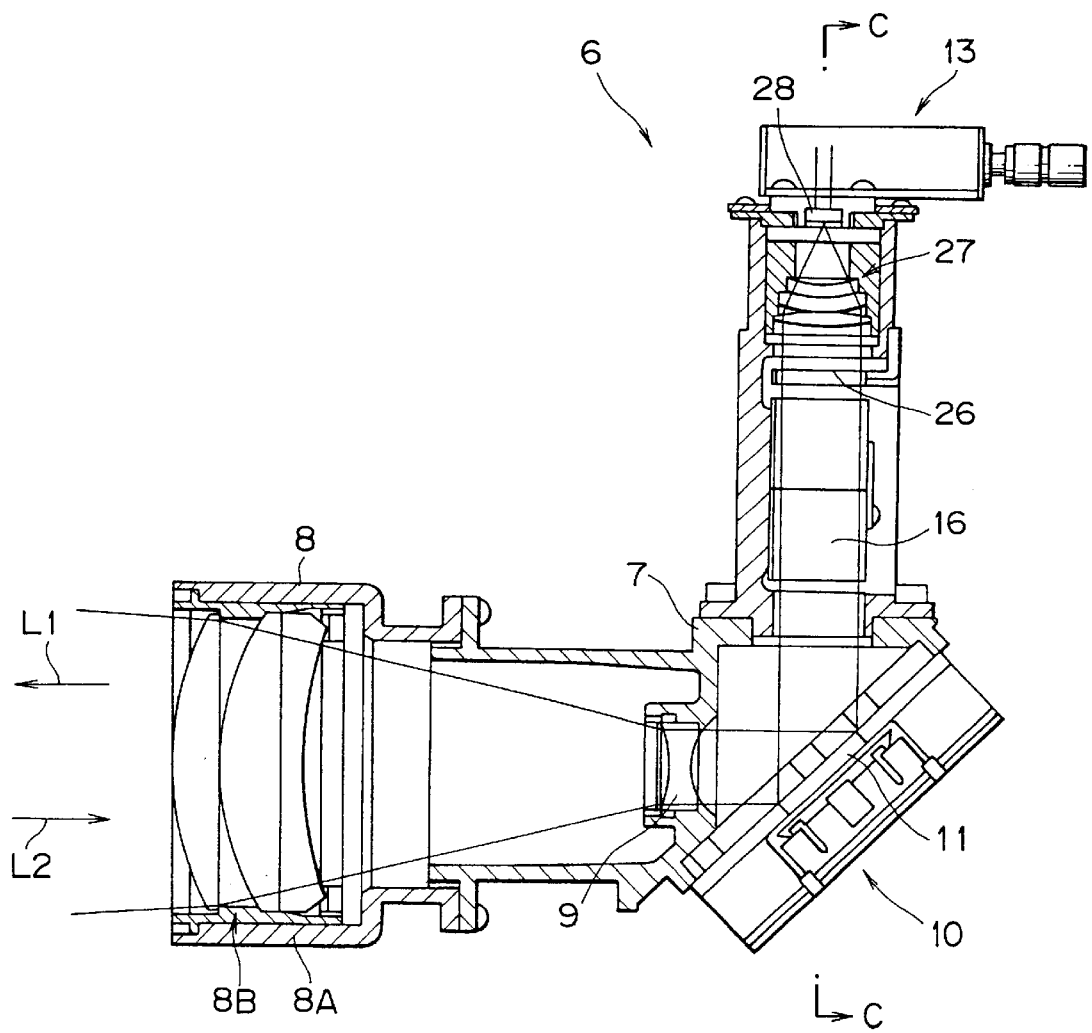
FIG. 3 is a schematic sectional view showing an optical system of the optical space transmission apparatus of FIG. 2.

As seen from FIG. 3 which is a view taken along a plane which passes an optical axis of the barrel bent by 90 degrees (and which shows a section taken along line B—B in FIG. 4 which is a sectional view taken along line A—A of FIG. 2), an interchangeable lens 8 is attached to a barrel body 7 of the free end side portion of the optical system 6.

The interchangeable lens 8 is formed such that it can be interchangeably attached to the end of the barrel body 7 in accordance with the distance to the communication object apparatus, and the barrel body 7 is held on the housing 2 with side faces thereof in contact with a V block (FIG. 2). Consequently, the barrel body 7 is not deformed even when the interchangeable lens 8 attached thereto is heavy.

The interchangeable lens 8 forms a condensing optical system wherein a plurality of lenses 8B are disposed in a holder 8A, and the barrel body 7 includes a concave lens 9 disposed rearward of the interchangeable lens 8. Consequently, the interchangeable lens 8 and the concave lens 9 form a beam expander which emits the transmission light beam L1 with a desired degree of broadening toward the communication object apparatus and converts the reception light beam L2 received from the communication object apparatus into substantially parallel rays.

An optical axis correction section 10 reflects, at a root portion of the barrel body 7 at which the barrel body 7 is bent in an L-shape, the transmission light beam L1 coming in from the optical module side portion of the optical system 6 by means of a mirror 11 so that the light path of the transmission light beam L1 is bent approximately by 90 degrees so that the transmission light beam L1 may go toward the free end side portion of the optical system 6 whereas the reception light beam L2 coming in from the free end side portion of the optical system 6 is reflected similarly by means of the mirror 11 to bend the light path of the reception light beam L2 by approximately 90 degrees so that the reception light beam L2 may go to the optical module side portion.

The optical axis correction section 10 is constructed such that the mirror 11 is turned around two axes perpendicular to each other in a reflection plane of the mirror 11 by predetermined electromagnetic actuators so that the mirror 11 can be inclined toward a desired direction. Consequently, when the transmission light beam L1 is introduced from the optical module side portion of the optical system 6 to the optical axis correction section 10 with the optical axis thereof registered substantially with the optical axis of the barrel body 7, the optical axis correction section 10 displaces the optical axis of the transmission light beam L1 and sends out the transmission light beam L1 toward the free end side portion of the optical system 6. On the other hand, when the reception light beam L2 follows the optical path of the transmission light beam L1 reversely and is introduced to the optical axis correction section 10 with the optical axis thereof displaced from the optical axis of the barrel body 7, the mirror 11 sends out the reception light beam L2 with the optical axis of the same substantially registered with the optical axis of the barrel body 7 toward the optical module side portion of the optical system 6.

Thus, the optical axis correction section 10 is constructed such that the mirror 11 can be turned within a predetermined range around a reference position, and an inclination of the mirror 11 from the reference position can be detected by means of skew sensors not shown.

Figure 4:
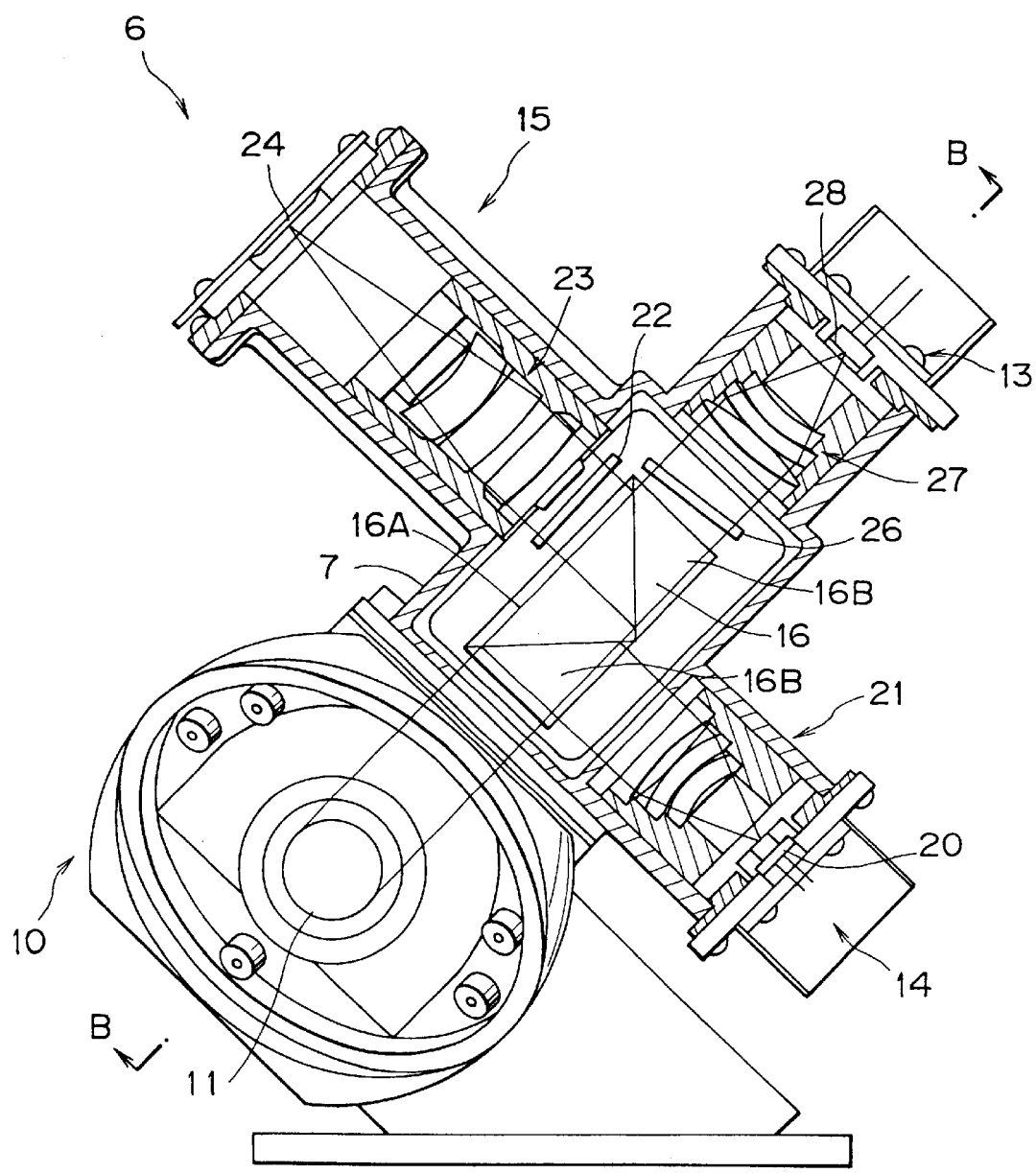
FIG. 4 is a sectional view taken along line A—A of FIG. 2 showing the optical system of the optical space transmission apparatus.

As seen from FIG. 4, the optical module side portion of the optical system 6 includes a light reception block 13 for receiving the reception light beam L2, a laser diode block 14 for emitting the transmission light beam L1, a position detection block 15 for receiving the reception light beam L2 and outputting a light reception result necessary to drive the optical axis correction section 10, and a prism 16 for distributing the reception light beam L2 to the light reception block 13 and the position detection block 15 and introducing the transmission light beam L1 emitted from the laser diode block 14 to the optical axis correction section 10.

The prism 16 includes a right angled triangular prism 16A of a large size, and a pair of right angled triangular prisms 16B of a small size adhered at oblique faces thereof to two perpendicular faces of the right angled triangular prism 16A, and is disposed such that the two adhered faces may define an angle of approximately 45 degrees with respect of the optical axis of the barrel as viewed from the cover glass plate 4 side. Further, the prism 16 has a vapor deposited film formed on one of the two adhered faces thereof which is adjacent the optical axis correction section 10 so that a laser beam having a predetermined polarization plane may be selectively reflected by the adhered face while it selectively passes therethrough another laser beam having a polarization plane perpendicular to that of the former laser beam. Consequently, the prism 16 has a polarizing beam splitter formed adjacent the optical axis correction section 10 and has a half mirror formed on the remaining adhered face thereof.

The laser diode block 14 emits, when the transmission light beam L1 is introduced into and reflected by the polarizing beam splitter formed adjacent the optical axis correction section 10, the transmission light beam L1 toward the optical axis correction section 10. Here, in the laser diode block 14, a laser diode 20 having a high modulation allowing frequency is driven with an information signal to produce the transmission light beam L1 of a predetermined polarization plane modulated with the information signal. The laser diode 20 of the laser diode block 14 is disposed at a predetermined angle with respect to the optical axis so that the transmission light beam L1 may be reflected by the polarizing beam splitter of the prism 16. The laser diode block 14 converts the transmission light beam L1 emitted from the laser diode 20 into substantially parallel rays by means of the converging optical system formed from a plurality of lenses 21 and emits the substantially parallel rays toward the prism 16.

Consequently, with the optical space transmission apparatus 1, the transmission light beam L1 modulated with the information signal is produced by the laser diode 20 and then emitted toward the communication object apparatus through the prism 16, optical axis correction section 10, concave lens 9 and interchangeable lens 8.

In the optical space transmission apparatus 1, the prism 16 and so forth are constructed such that the polarization plane of the transmission light beam L1 sent out into the space toward the communication object apparatus in this manner may be inclined by an angle of 45 degrees with respect to the vertical direction. Consequently, the optical space transmission apparatus 1 which is disposed in an opposing relationship to the communication object apparatus which has a similar construction to that of the optical space transmission apparatus 1 receives the reception light beam L2 which has a polarization plane perpendicular to the polarization plane of the transmission light beam L1. Consequently, the adhered face pair of the prism 16 which forms the polarizing beam splitter selectively passes the transmission light beam L1 therethrough so that the transmission light beam L1 is introduced to the adhered face pair which forms the half mirror, by which the reception light beam L2 is divided into two luminous fluxes.

Figure 5:
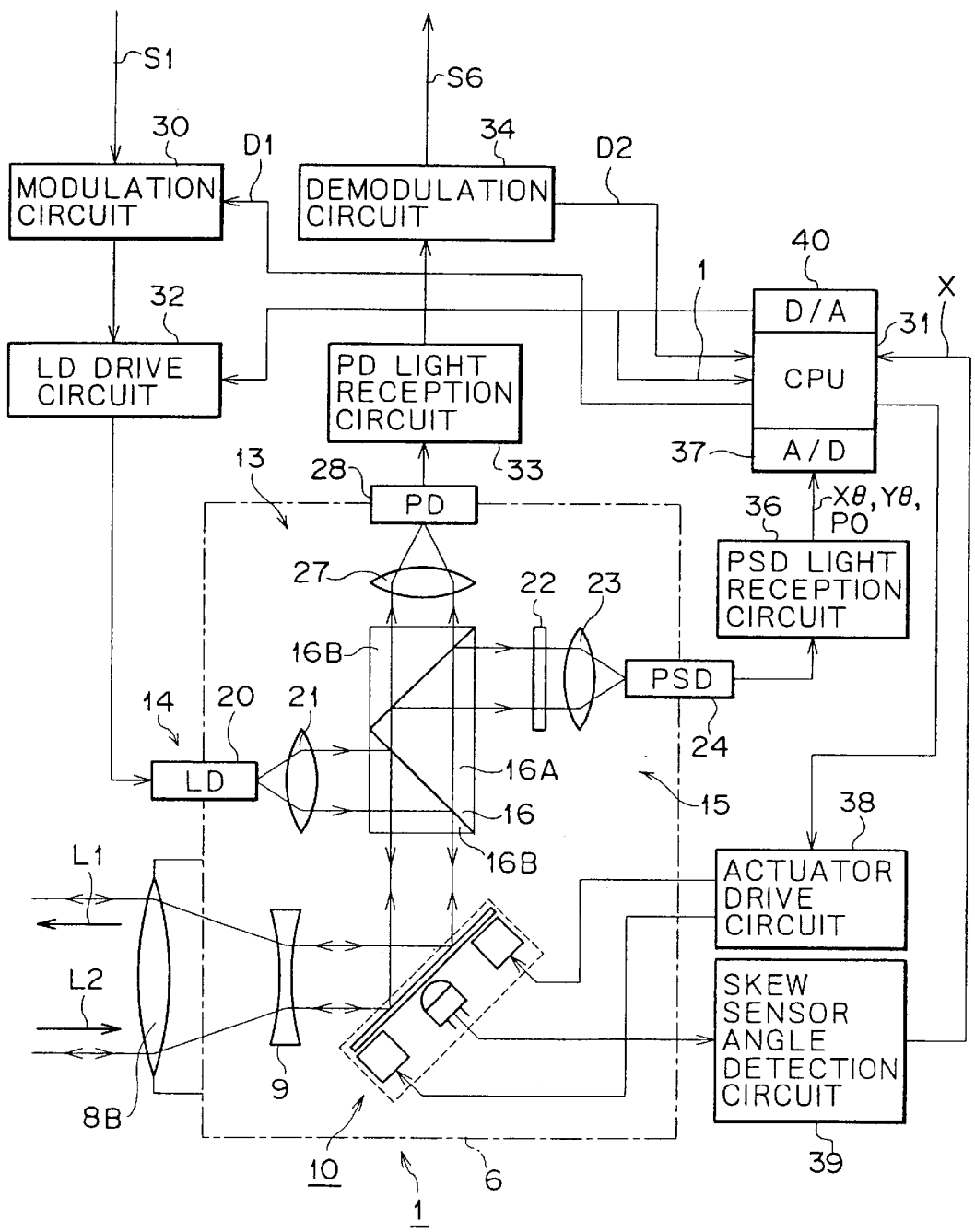
FIG. 5 is a block diagram of the optical space transmission apparatus of FIG. 2.

The laser diode 20 outputs a monitor signal of an emitted light amount in accordance with a so-called linear motor system to a laser diode (LD) drive circuit 32 (FIG. 5).

The position detection block 15 introduces one of the two luminous fluxes of the reception light beam L2 which has been reflected by the half mirror into a filter 22, which selectively passes a wavelength component of the reception light beam L2 therethrough. The position detection block 15 converts the reception light beam L2 having passed through the filter 22 into a converging luminous flux by means of a converting optical system formed from a plurality of lenses 23 and condenses the converging luminous flux on a light reception face of a position detection element (PSD: Position Sensitive Device) 24.

The light reception face of the position detection element (PSD: Position Sensitive Device) 24 is formed in a substantially rectangular shape, and electrodes are formed on the sides of the light reception face. The position detection element 24 photoelectrically converts a light beam condensed on the light reception face thereof and outputs results of the photoelectric conversion from the electrodes. At this time, the output ratio of the photoelectric conversion results outputted from the electrodes varies in response to the condensed position of the light beam on the light reception face.

Consequently, the position detection element 24 can detect the position of the light beam condensed on the light reception face in accordance with a two-dimensional coordinate system based on the output ratio of the photoelectric conversion results outputted from the electrodes disposed in an opposing relationship to each other. The position detection element 24 is disposed such that the axes of coordinates of the two-dimensional coordinate system may correspond to the two axes of turning motion of the optical axis correction section 10. Consequently, the optical space transmission apparatus 1 can detect the incoming direction of the reception light beam L2 in response to a correction direction of the optical axis of the optical axis correction section 10 based on the light reception result of the position detection element 24.

The light reception block 13 introduces the reception light beam L2 having passed through the half mirror of the prism 16 into a filter 26, which selectively passes a wavelength component of the reception light beam L2. The light reception block 13 converts the reception light beam L2 having passed through the filter 26 into a converging luminous flux by means of a converging optical system formed from a plurality of lenses 27 and condenses the converging luminous flux on a light reception face of a light reception element 28.

The light reception element 28 is composed of an avalanche photodiode and outputs a light reception result whose signal level varies in response to the light amount of the reception light beam L2.

Figure 6:
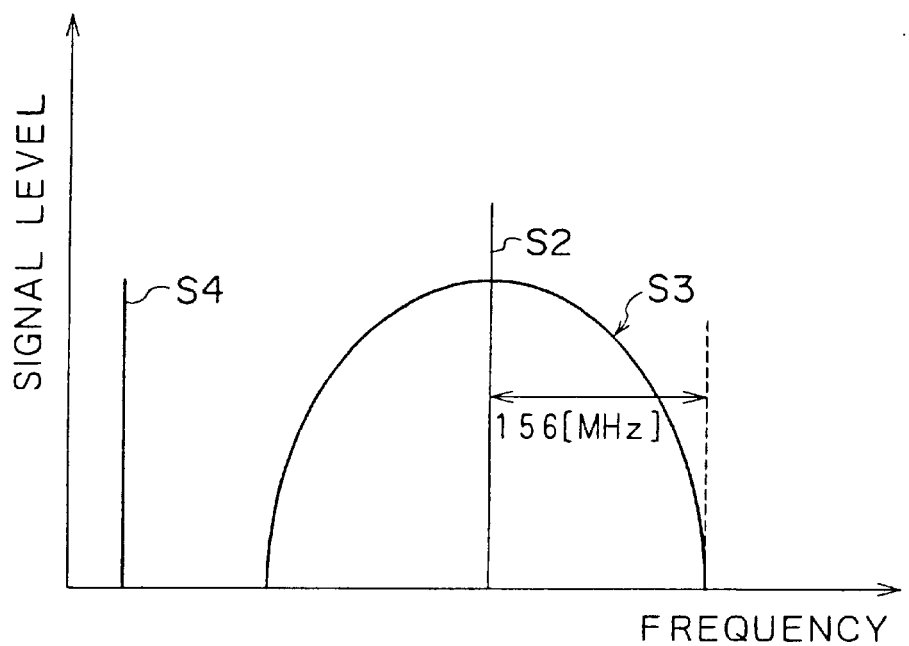
FIG. 6 is a diagram illustrating operation of a modulation circuit of the optical space transmission apparatus of FIG. 5.

FIG. 5 shows a construction of the optical space transmission apparatus 1 together with principal components of the optical system 6 described above. Referring to FIG. 5, a modulation circuit 30 in the optical space transmission apparatus 1 stores an information signal S1 inputted thereto from an external apparatus through the connector 3 (FIG. 2) into a predetermined buffer thereof not shown. Further, the modulation circuit 30 reads out the thus stored information signal S1 at a predetermined timing. A carrier signal S2 of a predetermined frequency fm is modulated with the information signal S1 to produce a modulated signal S3 of a frequency band of 312 MHz as seen in FIG. 6.

Further, the modulation circuit 30 adds a synchronization pattern and so forth to status data D1 outputted from a central processing unit (CPU) 31, and resulting data modulate a carrier signal S4 of a frequency of 6 MHz at the transmission rate of 38.4 bps to obtain a modulated signal. The modulation circuit 30 adds a resulting modulated signal to the modulated signal S3 of the information signal S1 to produce a drive signal. Consequently, the modulation circuit 30 frequency multiplexes the information signal S1 and the status data D1 to produce a drive signal.

Furthermore, the modulation circuit 30 switches, in the modulation processing, the signal levels of the carrier signals S2 and S4 under the control of the central processing unit 31 to vary the modulation degree of the modulated signals thereby to vary the modulation degree of the transmission light beam L1 produced with the drive signal.

The laser diode (LD) drive circuit 32 drives the laser diode 20 in accordance with the signal level of the drive signal thereby to cause the laser diode 20 to emit the transmission light beam L1 whose light amount varies in accordance with the signal level of the drive signal. In this instance, the laser diode drive circuit 32 drives the laser diode 20 based on a monitor signal of the light amount outputted from the laser diode 20 so that the peak light amount of the transmission light beam L1 may be equal to a light amount provided by the instruction of the central processing unit 31. Furthermore, in this instance, the laser diode drive circuit 32 notifies the central processing unit 31 of drive current I of the laser diode 20 required for emission of light of the light amount provided by the instruction from the central processing unit 31 in this manner. Also a monitoring result of the light amount outputted from the laser diode 20 is reported to the central processing unit 31 similarly.

A photodiode (PD) light reception circuit 33 converts the light reception result of the light reception element (PD) 28 from a current into a voltage and amplifies the voltage signal with a predetermined gain. The photodiode light reception circuit 33 waveform equalizes a result of the amplification and outputs the equalized amplification result to a demodulation circuit 34.

The demodulation circuit 34 receives the output signal of the photodiode light reception circuit 33, band separates the received signal, and binary value discriminates the separated signals to demodulate an information signal S6 and status data D2 sent out from the communication object apparatus. The demodulation circuit 34 buffers the information signal S6 and outputs it to the external apparatus through the connector 3. Meanwhile, the demodulation circuit 34 outputs the status data D2 to the central processing unit 31.

A PSD light reception circuit 36 performs current to voltage conversion of the light reception result of the position detection element (PSD) 24 and performs matrix calculation to obtain and output two-dimensional position displacement signals xθ and Yθ, which represent the incoming direction of the reception light beam L2, and a light amount detection signal P0 representative of the received light amount of the reception light beam L2.

An analog to digital conversion circuit (A/D) 37 performs analog to digital conversion processing of the position displacement signals xθ and Yθ and the light amount detection signal P0 to obtain position displacement information and light amount detection information which are results of the processing and outputs the information to the central processing unit 31. A digital to analog conversion circuit (D/A) 40 latches light amount control data outputted from the central processing unit 31 and converts the light amount control data into an analog signal. The digital to analog conversion circuit 40 outputs the analog signal as a control signal for instruction of a peak light amount of the transmission light beam L1 to the laser diode drive circuit 32.

An actuator drive circuit 38 controls operation of the optical axis correction section 10 under the control of the central processing unit 31 so that the condensed position of the reception light beam L2 formed on the light reception face of the position detection element 24 may be a predetermined position. Consequently, even if the optical space transmission apparatus 1 is vibrated by wind or some other cause, the transmission light beam L1 can be sent out correctly in the incoming direction of the reception light beam L2 to normally maintain the transmission channel.

A skew sensor angle detection circuit 39 processes output signals of the skew sensors disposed on the optical axis correction section 10 and reports a result of the processing as inclination information of the mirror 11 to the central processing unit 31.

The central processing unit 31 forms a system control circuit which controls operation of the entire light space transmission apparatus 1 and controls operation of the entire light space transmission apparatus 1 in accordance with control commands inputted thereto together with the information signal S1.

It is to be noted that the central processing unit 31 controls operation of the actuator drive circuit 38 based on position displacement information inputted thereto from the analog to digital conversion circuit 37 so that, upon installation of the optical space transmission apparatus 1, when the reception light beam L2 is received from the communication object apparatus, the transmission light beam L1 is emitted in the incoming direction of the reception light beam L2 thereby to establish a transmission channel. After the transmission channel is established in this manner, the central processing unit 31 controls operation of the actuator drive circuit 38 in a similar manner in accordance with the position displacement information so that the transmission channel may be maintained even if the optical space transmission apparatus 1 is vibrated entirely by wind or some other cause.

In this control, the central processing unit 31 controls operation of the actuator drive circuit 38 in accordance with the inclination information of the mirror 11 outputted from the skew sensor angle detection circuit 39 so that the mirror 11 may not move out of its range of movement thereby to prevent a possible failure of the optical axis correction section 10.

Further, the central processing unit 31 fetches the inclination information of the mirror 11 at predetermined intervals of time and moving averages the fetched inclination information to calculate the inclination of the center of movement of the mirror 11. If the inclination of the center of movement of the mirror 11 varies by an amount greater than a predetermined amount from the center value, then the central processing unit 31 determines that the movement of the mirror 11 is estimated to go out of the range of normal movement, and. issues an electronic mail to a registered notification destination through the connector 3. Consequently, even if, for example, the installation location of the optical space transmission apparatus 1 exhibits some variation by a secular change or the like, a necessary countermeasure can be taken before correction by the optical axis correction section 10 becomes difficult to make it difficult to maintain the transmission channel.

The central processing unit 31 similarly fetches information of the drive current I outputted from the laser diode drive circuit 32 at fixed intervals of time and moving averages the fetched information. Further, if the moving averaged drive current value exceeds a reference current value required for emission of the amount of light set in advance, then the central processing unit 31 issues an electronic mail similarly. Thus, the central processing unit 31 detects deterioration of the laser diode 20 from the drive current and, if the degree of the deterioration exceeds a fixed value, then the central processing unit 31 reports this to the notification destination set in advance so that a necessary countermeasure may be taken.

The central processing unit 31 produces status data D1 based on the inclination of the center of movement of the mirror 11 and the moving averaged drive current value and outputs the status data D1 to the modulation circuit 30 so that the information may be reported also to the communication object apparatus. Consequently, the central processing unit 31 can report deterioration of the laser diode 20 or the like also to the communication object apparatus when necessary.

Figure 7:
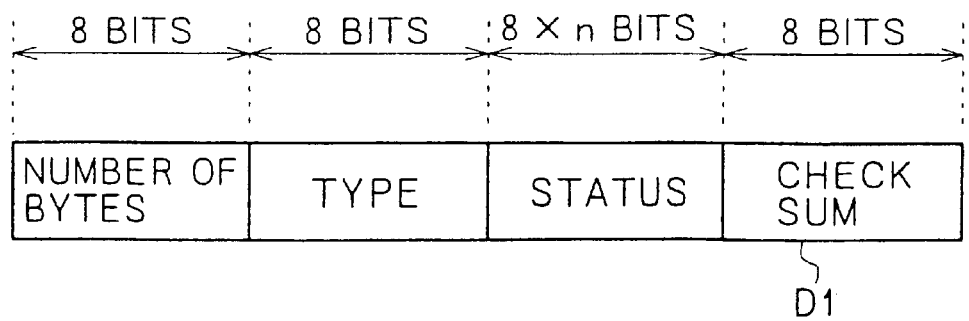
FIG. 7 is a diagrammatic view illustrating status data handled in the optical space transmission apparatus of FIG. 5.

FIG. 7 illustrates the status data D1 produced by the central processing unit 31 in such a manner as described above. Referring to FIG. 7, the central processing unit 31 sets the number of bytes of the status data D1 to the top 8 bits, and sets a command representing of a type of the data to the following 8 bits. Further, the central processing unit 31 allocates contents of the data to the following 8×n bits and thus allocates the inclination information of the center of movement or the drive current value to the 8×n bits. It is to be noted that, where the drive current value is allocated, also the corresponding power of the transmission light beam L1 is allocated together to the area of the 8×n bits when necessary. Furthermore, the central processing unit 31 allocates a check sum for error correction to the following 8 bits.

Figure 1:
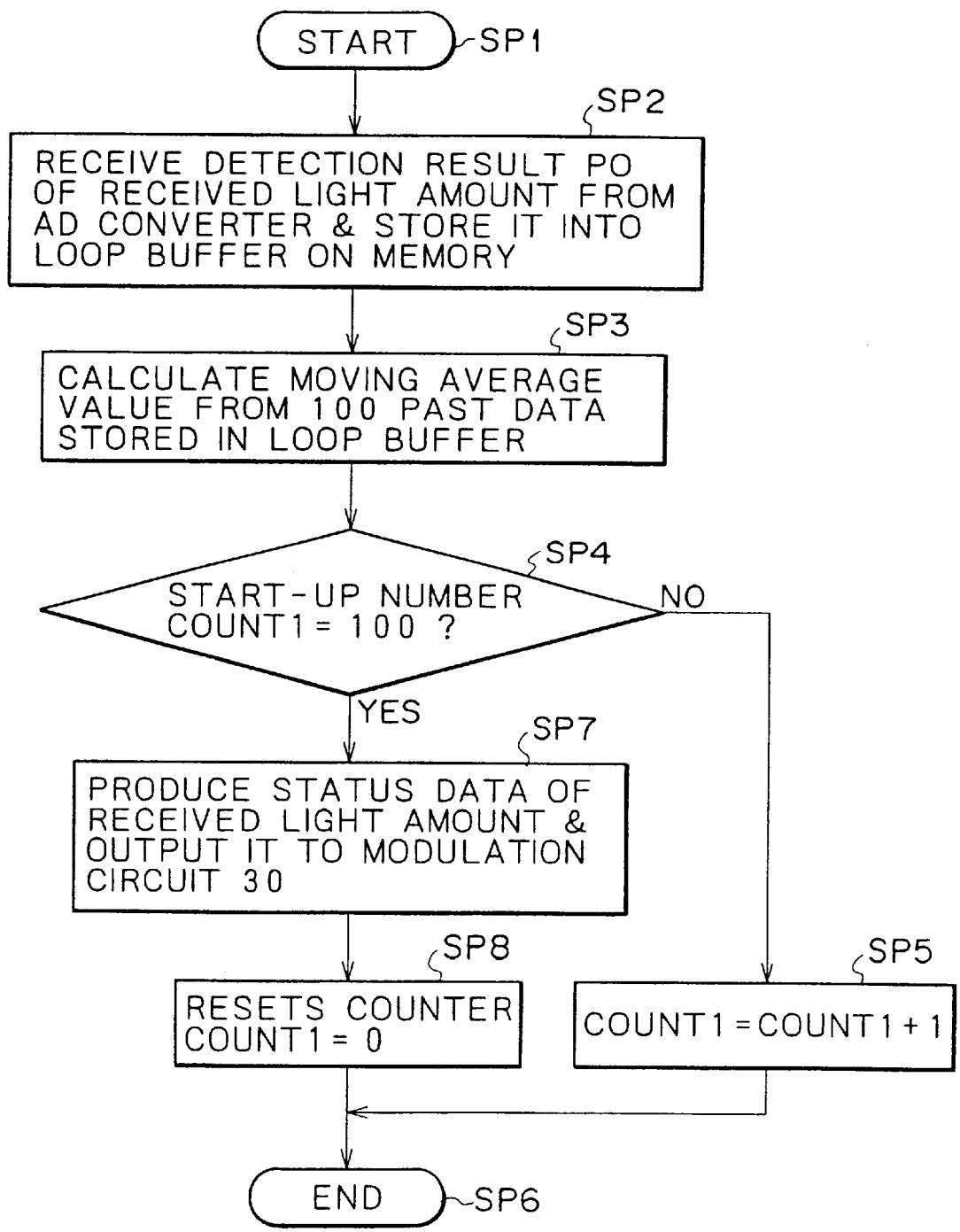
FIG. 1 is a flow chart illustrating a processing procedure of a central processing unit of an optical space transmission apparatus to which the present invention is applied.

Further, the central processing unit 31 executes a processing procedure illustrated in FIG. 1 at intervals of, for example, 1 msec with reference to a time measurement value of a timer to report information of the received light amount as one of the status data D1 to the communication object apparatus. In particular, referring to FIG. 1, when the timer indicates that a processing start time comes, the central processing unit 31 advances its control from step SP1 to step SP2, in which it receives the light amount detection result P0 of the reception light beam L2 through the analog to digital conversion circuit 37 and records the light amount detection result P0 into the loop buffer on the memory not shown.

Then, the central processing unit 31 advances its control to step SP3, in which it calculates a moving average from 100 light amount detection results P0 in the past stored in the loop buffer. Then, the central processing unit 31 advances its control to step SP4, in which it discriminates from a counter value COUNT1 for time measurement whether or not the moving average calculation has been successively repeated 100 times after a received light amount is reported to the communication object apparatus. If a negative result is obtained, then the central processing unit 31 advances its control to step SP5, in which it increments the counter value COUNT1 by one, whereafter it advances its control to step SP6, in which it ends the processing procedure.

Consequently, the central processing unit 31 repeats the processing procedure of steps SP1–SP2–SP3–SP4–SP5–SP6 successively 99 times, and when the processing procedure is executed for the 100th time, an affirmative result is obtained in step SP4, and the control of the central processing unit 31 now advances to step SP7. In step SP7, the central processing unit 31 produces status data D1 described hereinabove with reference to FIG. 7 from the received light amount detection result obtained by the moving average calculation in step SP3, and outputs the status data D1 to the modulation circuit 30. Thus, the central processing unit 31 reports an average value of the light amount of the received reception light beam L2 at intervals of 1 second to the communication object apparatus.

The central processing unit 31 thereafter advances its control to step SP8, in which it resets the counter value COUNT1 to the value 0, whereafter it advances its control to step SP6, in which it ends the processing procedure.

By the processing described above, the optical space transmission apparatus 1 sends out drive current of the laser diode which is information of an operation condition regarding sending out of the transmission light beam L1, a received light amount which is information of an operation condition regarding reception of the reception light beam, and inclination information of the mirror together with the information signal S1 to the communication object apparatus.

It is to be noted that the central processing unit 31 can store such status data as described above as history information into a predetermined memory so that the data can be used for maintenance.

Further, the central processing unit 31 receives, from the demodulation circuit 34, the status data D2 sent out together with the information signal S6 from the communication object apparatus, and discriminates, of the status data D2, information of the drive current of the laser diode and the inclination of the mirror similarly as in the case of the self apparatus, and then, if necessary, issues an electronic mail.

Figure 8:
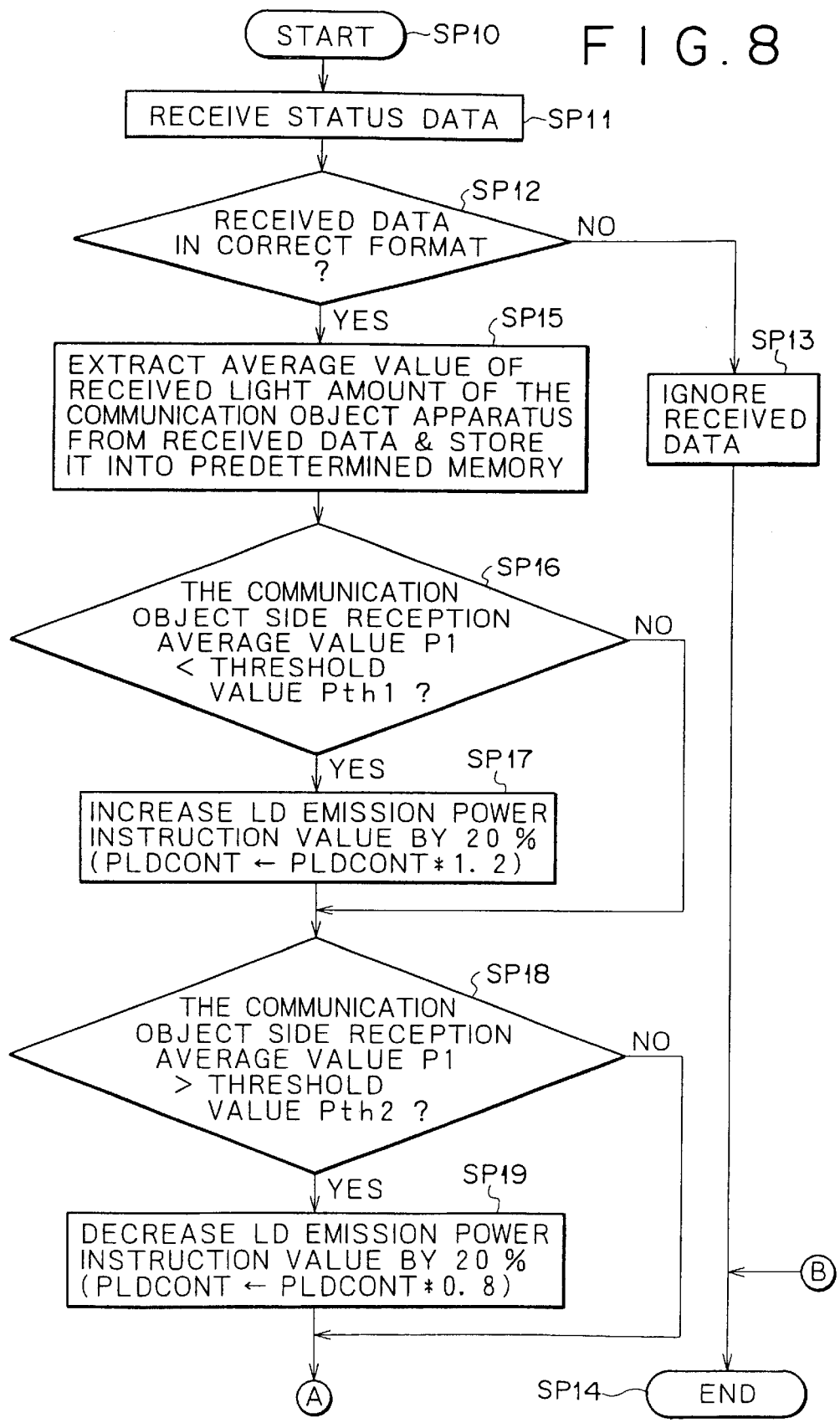
FIGS. 8 and 9 are flow charts illustrating a processing procedure of light amount control of a transmission light beam used in the optical space transmission apparatus of FIG. 5.
Figure 9:
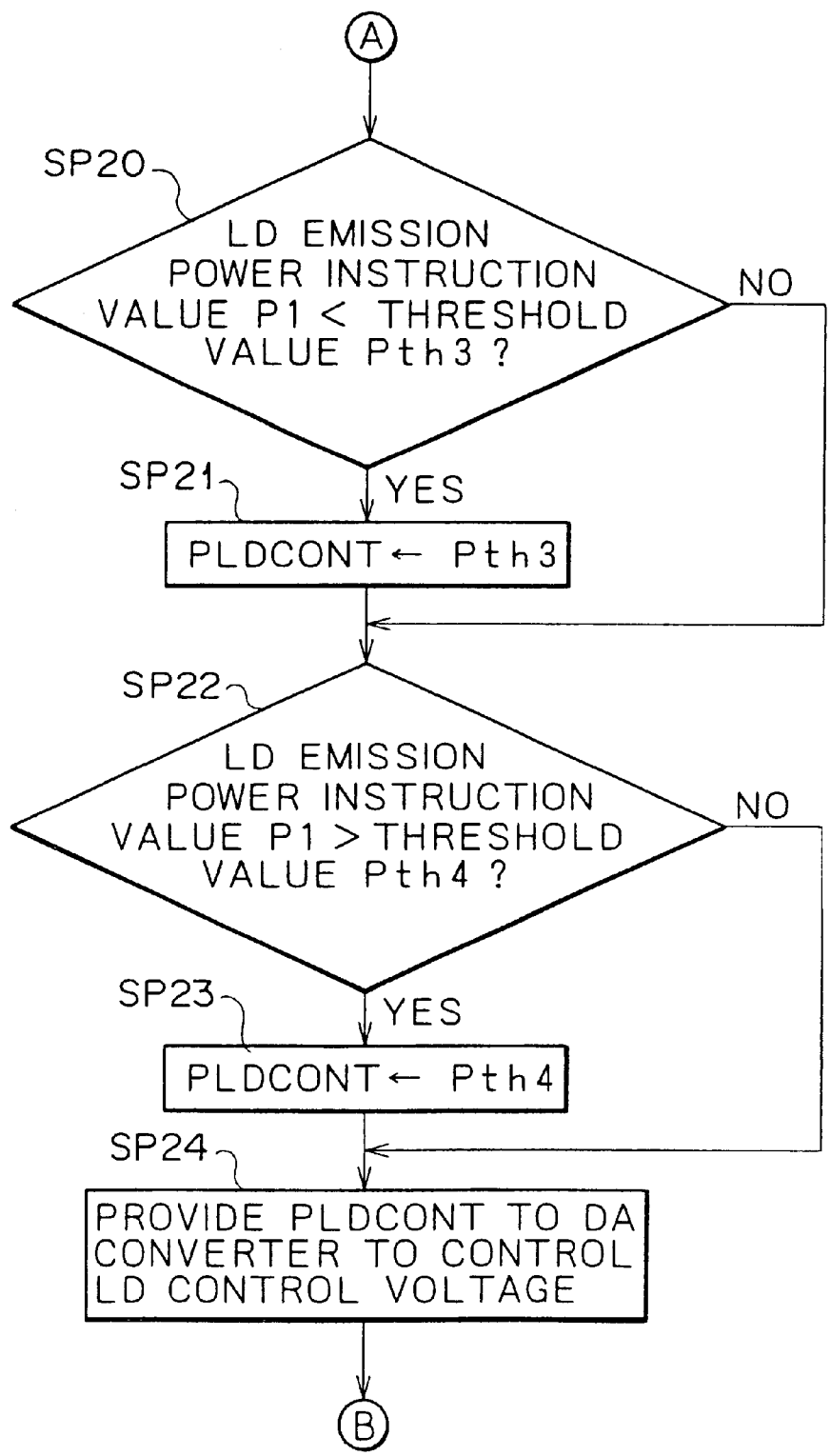

In contrast, where the status data D2 is a received light amount, the central processing unit 31 executes a processing procedure illustrated in FIGS. 8 and 9 to correct the light amount of the transmission light beam L1 based on the received light amount of the communication object apparatus.

In particular, referring first to FIG. 8, the central processing unit 31 starts processing of the processing procedure of steps SP10 to SP24, for example, once for one second. After the processing is started, the central processing unit 31 advances its control from step SP10 to step SP11, in which it requests the communication object apparatus for a received light amount average value of the communication object apparatus and receives such data from the communication object apparatus or receives data sent periodically from the communication object apparatus. After the central processing unit 31 receives status data D2 from the demodulation circuit 34, it advances its control to step SP12, in which it confirms the format of the received data because the user may possibly transmit control data or the like set by the user itself. If the format of the received data is different from that of data of a received light amount or some other different format, then the central processing unit 31 advances its control to step SP13, in which it ignores the received data as the processing for a received light amount. Thereafter, the central processing unit 31 advances its control to step SP14, in which it ends the processing procedure.

On the other hand, if the format of the received data is correct, then since an affirmative result is obtained in step SP12, the central processing unit 31 advances its control to step SP15. In step SP15, the central processing unit 31 extracts information of a received light amount allocated to the status (FIG. 7) from the received data and stores the information into the memory.

Then, the central processing unit 31 advances its control to step SP16, in which it discriminates whether or not the received light amount P1 is smaller than a threshold value Pth1. If an affirmative result is obtained in step SP16, then the central processing unit 31 advances its control to step SP17, in which it sets a variable PLDCONT, which defines a light amount of the transmission light beam L1, so that the light amount of the transmission light beam L1 may be increased by 20%, whereafter it advances its control to step SP18. On the other hand, if a negative result is obtained in step SP16, then the central processing unit 31 advances its control directly to step SP18.

Here, the threshold value Pth1 represents a received light amount necessary for the information signal S1 to be demodulated at a bit error rate lower than a predetermined bit error data when the transmission light beam L1 sent out from the optical space transmission apparatus 1 is received by the communication object apparatus.

Figure 10A:
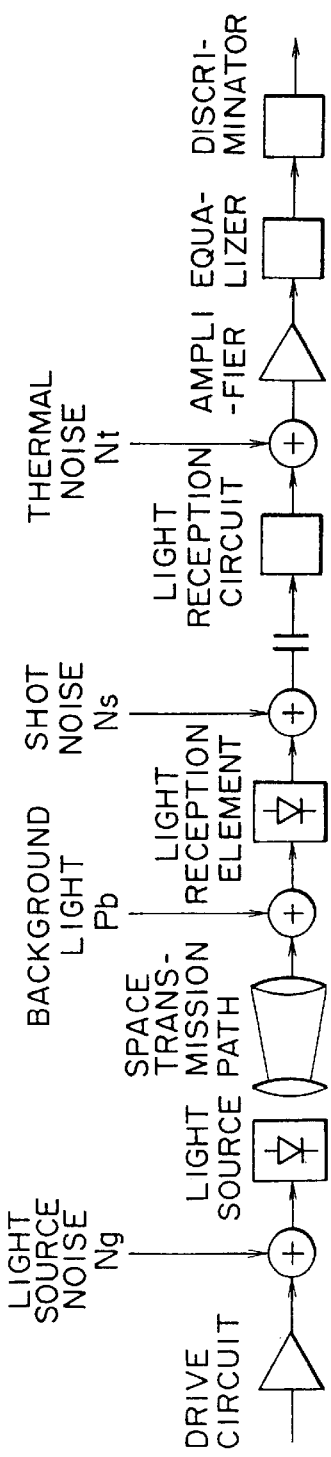
FIGS. 10A through 10D are diagrammatic views illustrating a transmission characteristic of a transmission system.

In particular, in the optical space transmission apparatus 1 according to the present embodiment, a transmission system with the communication object apparatus can be represented in such a manner as shown in FIGS. 10A through 10D. In such a transmission system as shown in FIGS. 10A through 10D, when the transmission light beam L1 is emitted, light source noise Ng is superposed on the information signal, and when the transmission light beam L1 is received, noise Pb by background light is mixed into the information signal. Further, when the information signal is photoelectrically converted by the light receiving element, shot noise Ns is mixed into the information signal, and when the information signal is processed by the light reception circuit, thermal noise Nt is mixed into the information signal (FIG. 10A).

Figure 10B:
Figure 10C:
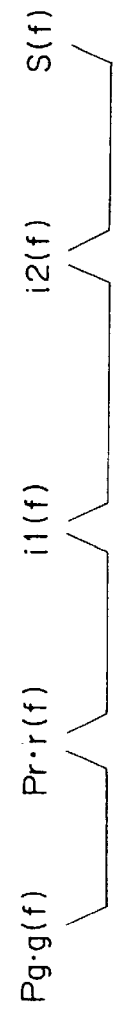

Consequently, the waveform shape of a power waveform Pg·g(t) of the transmission light beam L1 sent out in intensity modulation is deteriorated, and noise is superposed on the deteriorated waveform of the power waveform Pg·g(t). Consequently, binary identification is finally based on the thus deteriorated waveform with the noise superposed thereon (FIG. 10B). It is to be noted that, in FIGS. 10B and 10C, reference symbol Pr·r(t) denotes a received light power waveform received by the communication object apparatus; i1(t) denotes a signal waveform of a photoelectrically converted light reception result; i2(t) denotes a signal waveform after current to voltage conversion; and S(t) denotes a signal waveform immediately prior to demodulation. In the present transmission system, the waveform shape of the power waveform Pg·g(t) is deteriorated, and binary discrimination is performed finally based on the waveform of the power waveform Pg·g(t) on which noise is further superposed.

Figure 10D:
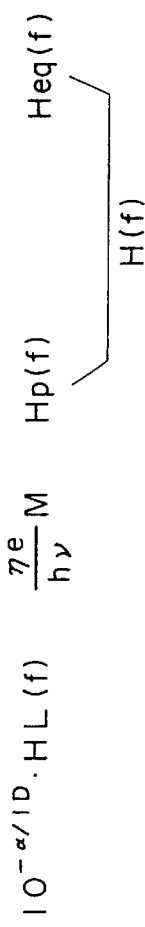

Further, reference symbols Pg·g(f), Pr·r(f), i1(f), i2(f), and S(f) denote Fourier transforms of the corresponding signal waveforms (FIG. 10C), and $10^a \cdot HL(f)$ (a=−α/10) denotes a transfer function of the space transmission path (FIG. 10D). Further, πe/hυ×M denotes a quantum effect which is a transfer function of the light reception element, and is, in the case of a photodetector, approximately 0.55. Further, H(f) denotes a transfer function of the signal processing system and is represented by a product of the transfer function Hp(f) of the light reception circuit and the transfer function Heq(f) of the other signal processing circuits.

If, in such a model as described above, no equalization of the reception waveform is required and the noise index of the amplification circuit is a fixed value N(f)=N0 and besides the frequency characteristic Hp(f) of the light reception circuit is Hp(f)=1, then the SNR of an impulse response in the transmission system is represented by the following expression:

$$SNR = \frac{\{\zeta \cdot M \cdot Pr \cdot r(t)\}^2}{\zeta \cdot M^{2+x}\{Pr \cdot r(t) + Pb\}B0 + 4kT \cdot N0 \cdot B0/R} \quad (1)$$

$$\text{where } B0 = \int_0^\infty |H(f)|^2 df$$

where M is the current multiplication effect of the avalanche photodiode (APD) used as the light reception element. An avalanche photodiode multiplies shot noise simultaneously when it multiplies a signal. Further, in the expression above, x is the excess noise index, and is approximately 0.3 with a Si-APD, but is approximately 1 with a Ge-APD. It is to be noted that, where a Pin-photodiode which does not have a current multiplication effect is used as the light reception element, naturally M is 1 and also x is 1.

Further, in the expression above, k is the Boltzmann's constant ($1.38 \times 10^{-23}$ J/N), R is the load resistance, T is the absolute temperature, ζ is the quantum efficiency (A/W), and Pb is the background light amount. Here, in the expression (1) above, the first term of the denominator represents shot noise, and the second term represents thermal noise. If analog amplitude modulation of the modulation degree ma given by $g(t) = (1 + ma \cos\omega_0 t)$ is applied to a model indicated by the expression (1) above, then the expression (1) can be transformed to the following expression:

$$\frac{SPP}{Nrms} = \frac{\{\zeta \cdot M \cdot 2ma \cdot APr\}^2}{\{2e\zeta \cdot M^{2+X} APr\}B0 + 4kT \cdot N0 \cdot B0/R} \quad (2)$$

where APr represents average received light power.

Here, if it is assumed that the SN (SPP/Nrms) with which the bit error is less than $10^{-9}$ is 14 dB, then by substituting the Boltzmann's constant k=1.38E−23, the absolute temperature T=300, the charge of an electron e=1.60E−19, the quantum efficiency ζ=0.55, the modulation degree ma=1, the load resistance R=200 Ω, the noise index of the amplifier N0=5 dB and the multiplication factor M=50 into the expression (2) to solve it, then an average received light power APr=−48 dBm (noise band 100 MHz) can be obtained.

In the central processing unit 31, the threshold value Pth1 is set to a value corresponding to the average received light power APr. Consequently, the central processing unit 31 controls the light amount of the transmission light beam L1 to transmit an information signal while assuring a predetermined bit error rate so that the received light amount at the communication object apparatus may be equal to or greater than a predetermined light amount.

The central processing unit 31 discriminates, in the following step SP18, whether or not the received light amount P1 is greater than another predetermined threshold value Pth2. If an affirmative result is obtained in step SP18, then the central processing unit 31 advances its control to step SP19, in which it sets the variable PLDCONT which defines the light amount of the transmission light beam L1 so that the light amount of the transmission light beam L1 may be decreased by 20%, whereafter the central processing unit 31 advances its control to step SP20 (FIG. 9). On the other hand, if a negative result is obtained in step SP18, then the central processing unit 31 advances its control directly to step SP20.

Here, the threshold value Pth2 provides a light amount with which, even if the light amount of the transmission light beam L1 is decreased by 20%, a received light amount necessary for demodulation of the information signal S1 at a bit error rate lower than the predetermined bit rate mentioned above can be assured, and is a light amount which corresponds to the average received light power APr described above to which a predetermined margin is provided.

Consequently, when a sufficient amount of light is assured with the communication object apparatus, the central processing unit 31 reduces the light amount of the transmission light beam L1 and decreases the burden to the laser diode 20 as much.

Referring now to FIG. 9, the central processing unit 31 discriminates in the following step SP20 whether or not the light amount of the transmission light beam L1 specified by the variable PLDCONT set in such a manner as described above is smaller than a further predetermined threshold value Pth3. If an affirmative result is obtained in step SP20, then the central processing unit 31 advances its control to step SP21, in which it re-sets the variable PLDCONT which defines the light amount of the transmission light beam L1 so that the light amount of the transmission light beam L1 may be set to the threshold value Pth3, whereafter the central processing unit 31 advances its control to step SP22. On the other hand, if a negative result is obtained in step SP20, then the central processing unit 31 advances its control directly to step SP22.

Here, the threshold value Pth3 is a light amount corresponding to a transition point at which the relationship between the drive current and the emitted light amount varies from a nonlinear characteristic to a linear characteristic. Consequently, the central processing unit 31 thereafter controls operation of the laser diode 20 so that, upon amplitude modulation of the transmission light beam L1, the transmission light beam L1 may be emitted using only a region which is superior in linearity.

Then, in step SP22, the central processing unit 31 discriminates whether or not the light amount of the transmission light beam L1 specified by the variable PLDCONT set in such a manner as described above is larger than a still further predetermined threshold value Pth4. If an affirmative result is obtained in step SP22, then the central processing unit 31 advances its control to step SP23, in which the central processing unit 31 resets the variable PLDCONT which defines the light amount of the transmission light beam L1 so that the light amount of the transmission light beam L1 may be set to the threshold value Pth4, whereafter the central processing unit 31 advances its control to step SP24. On the other hand, if a negative result is obtained in step SP22, then the central processing unit 31 advances its control directly to step SP24.

Here, the threshold value Pth4 is a preset value corresponding to a maximum specification of the laser diode. Consequently, the central processing unit 31 controls operation of the laser diode 20 so that the transmission light beam L1 may not be emitted with a power exceeding a limit value set in advance.

In step SP24, the central processing unit 31 sets the variable PLDCONT to the digital to analog conversion circuit 40 to instruct the laser diode drive circuit 32 to vary the light amount, whereafter it advances its control to step SP14, in which it ends the processing procedure.

Further, the central processing unit 31 instructs, in relation to the control of the light amount of the transmission light beam L1 executed in such a manner as described above, the modulation circuit 30 of a signal level of the carrier signal S2 based on a monitoring result of the transmission light beam L1 outputted from the laser diode drive circuit 32. Consequently, even when the light amount of the transmission light beam L1 to be emitted from the laser diode 20 is varied, the transmission light beam L1 is emitted with a fixed modulation degree.

1-2. Operation of the First Embodiment

The optical space transmission apparatus 1 having such a construction as described above is installed, for example, on the roof of a building in an opposing relationship to the communication object apparatus having a similar construction (FIGS. 2 and 5), and a transmission light beam L1 emitted from the laser diode 20 is successively reflected by the polarizing beam splitter of the prism 16 and the optical axis correction section 10 and is emitted through the concave lens 9 and the lenses 8B toward the communication object apparatus with a predetermined degree of broadening. Also from the communication object apparatus, a reception light beam L2 is emitted similarly toward the optical space transmission apparatus 1.

When the reception light beam L2 sent out from the communication object apparatus enters the lenses 8B, it is converted into substantially parallel rays by the lenses 8B and the concave lens 9 and then successively reflected by the optical axis correction section 10 and the half mirror of the prism 16 so that it is condensed upon the position detection element 24. A result of light reception of the position detection element 24 is processed by the PSD light reception circuit 36 to detect the condensed light position of the reception light beam L2 on the light reception face of the position detection element 24, and the incoming direction of the reception light beam L2 is detected from the condensed light position by the central processing unit 31. Further, the mirror 11 (FIG. 3) of the optical axis correction section 10 is inclined by the central processing unit 31 so that the condensed light position of the reception light beam L2 may be a predetermined position. Consequently, the emission direction of the transmission light beam L1 is set so that the transmission light beam L1 may be emitted in the incoming direction of the reception light beam L2.

Consequently, also with the communication object apparatus, a condition wherein the transmission light beam L1 can be received is established, and a transmission channel is established between the optical space transmission apparatus 1 and the communication object apparatus.

After the transmission channel is established in this manner, in the optical space transmission apparatus 1, an information signal S1 in the form of an ethernet signal inputted from an external apparatus modulates a carrier signal S2 in the modulation circuit 30 to produce a drive signal, and the transmission light beam L1 is modulated so that the light amount thereof may be varied in accordance with the signal level of the drive signal. Consequently, the information signal S1 is sent out on the transmission light beam L1 toward the communication object apparatus. Further, a reception light beam L2 modulated with a information signal in a similar manner and sent out from the communication object apparatus is received by the light reception element 28, and a result of the light reception is processed by the photodiode light reception circuit 33 and the demodulation circuit 34 to receive the information signal S6.

When the information signal S1 and S6 are transmitted or received in this manner, similarly as upon establishment of a connection of the transmission channel, in the optical space transmission apparatus 1, the incoming direction of the reception light beam L2 is detected by the position detection element 24, and the inclination of the mirror 11 of the optical axis correction section 10 is controlled based on a result of the detection by the central processing unit 31. Consequently, in the optical space transmission apparatus 1, a servo loop is formed to correct the emitting direction of the transmission light beam L1 so that, also when the optical space transmission apparatus 1 is vibrated or in a like case, the transmission channel is prevented from being interrupted.

In the present control of the optical space transmission apparatus 1, the inclination of the mirror 11 is detected by the skew sensor angle detection circuit 39, and the inclination of the mirror 11 is controlled so that the mirror 11 may not go out of the predetermined range of movement. Further, a moving average of the inclination of the mirror 11 is calculated by the central processing unit 31, and if this inclination varies by more than a predetermined reference value, then this is reported to a registered object by an electronic mail. Consequently, the optical space transmission apparatus 1 can take a necessary countermeasure before correction by the optical axis correction section 10 becomes difficult as a result of secular change or the like until maintenance of the transmission channel becomes difficult.

Further, the drive current of the laser diode 20 is monitored by the central processing unit 31, and if an average value of the drive current exceeds a reference current value, then an electronic mail is issued in a similar manner. Consequently, the optical space transmission apparatus 1 can take a necessary countermeasure if deterioration of the laser diode 20 is detected from the drive current and the degree of the deterioration proceeds by more than a predetermined value.

Further, in the optical space transmission apparatus 1, the light amount of the reception light beam L2 is detected from a result of the light reception of the position detection element 24 which detects the incoming direction of the reception light beam L2 in this manner, and a moving average value of the light amount is calculated (FIG. 1). Further, the thus calculated light amount is frequency multiplexed as status data D1 with an information signal S1 (FIG. 6) and reported to the communication object apparatus.

Further, a received light amount of the transmission light beam L1 transmitted in a frequency multiplexed condition with an information signal S6 from the communication object apparatus in a similar manner is demodulated by the demodulation circuit 34, and the central processing unit 31 controls the light amount of the transmission light beam L1 so that the received light amount may be maintained within a fixed range (FIG. 9). Also in the communication object apparatus, the light amount of the reception light beam L2 is controlled so that the light amount reported from the optical space transmission apparatus 1 may be maintained within a fixed range (FIG. 9).

Figure 11:
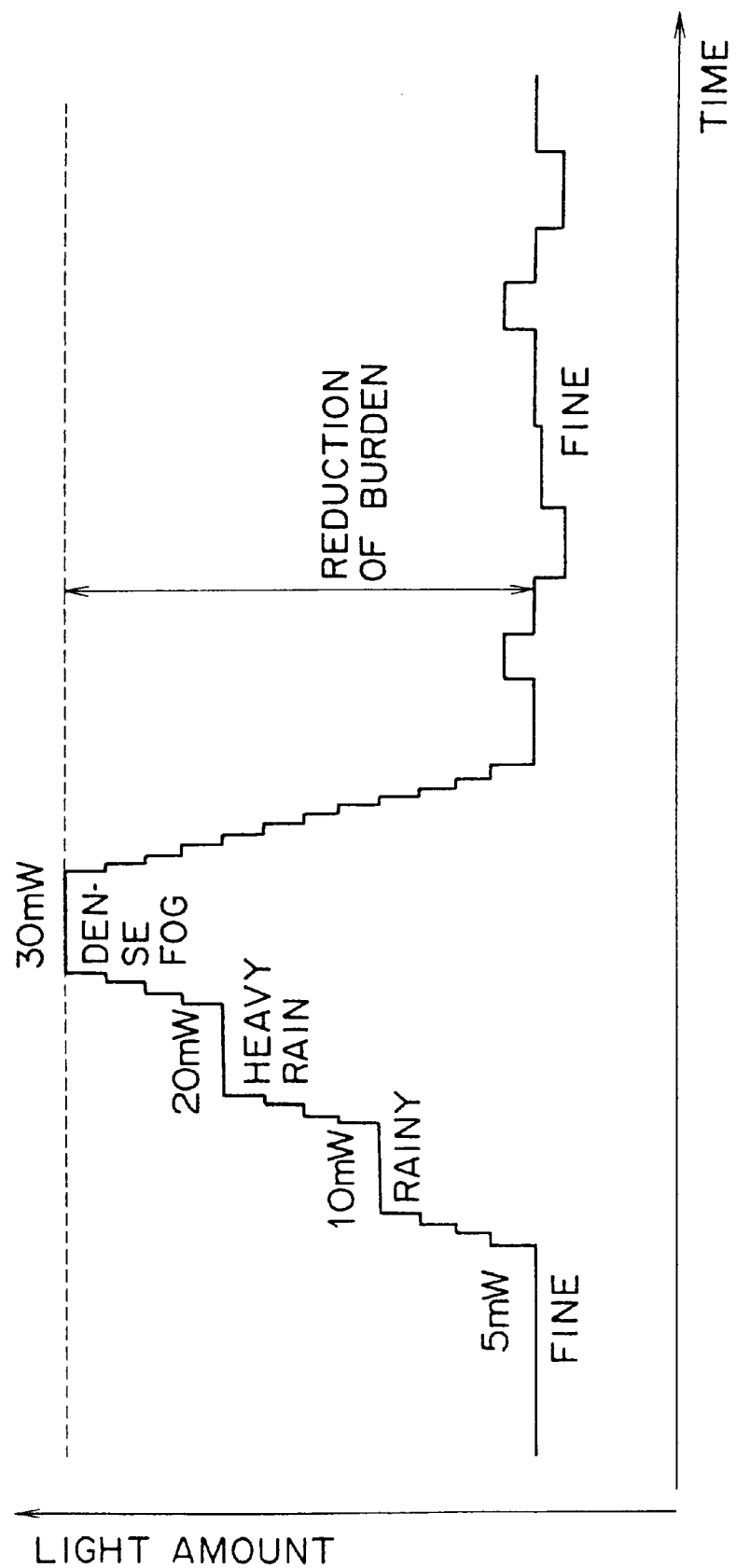
FIG. 11 is a time chart illustrating a variation of a transmission light beam.

Consequently, as seen from FIG. 11, in the optical space transmission apparatus 1, if the loss of the transmission path is increased by fog, rain or the like, then the light amount of the transmission light beam L1 is increased so as to compensate for the increase of the loss. Accordingly, when the loss of the transmission path is low, the light amount of the transmission light beam L1 can be reduced as much to moderate the burden on the laser diode 20. Accordingly, a result of reception of light on the reception side of the light beam can be grasped by the transmission side and the transmission light beam can be sent out with a suitable light amount, and consequently, the frequency of replacement of the light emitting element can be reduced with a simple construction.

It is to be noted that, also on the communication object apparatus side, the light amount of the reception light beam L2 can be controlled in a similar manner, and the frequency of replacement of the light emitting element can be reduced with a simple construction as much.

Further, at this time, as the received light amount of the communication object apparatus is grasped and the light amount of the light beam is controlled by the transmission side, even if the condition of the transmission path is different between the optical space transmission apparatus 1 and the communication object apparatus, the light amount of the light beam can be controlled appropriately and with certainty so that a desired information,signal can be transmitted or sent with certainty.

Figure 12:
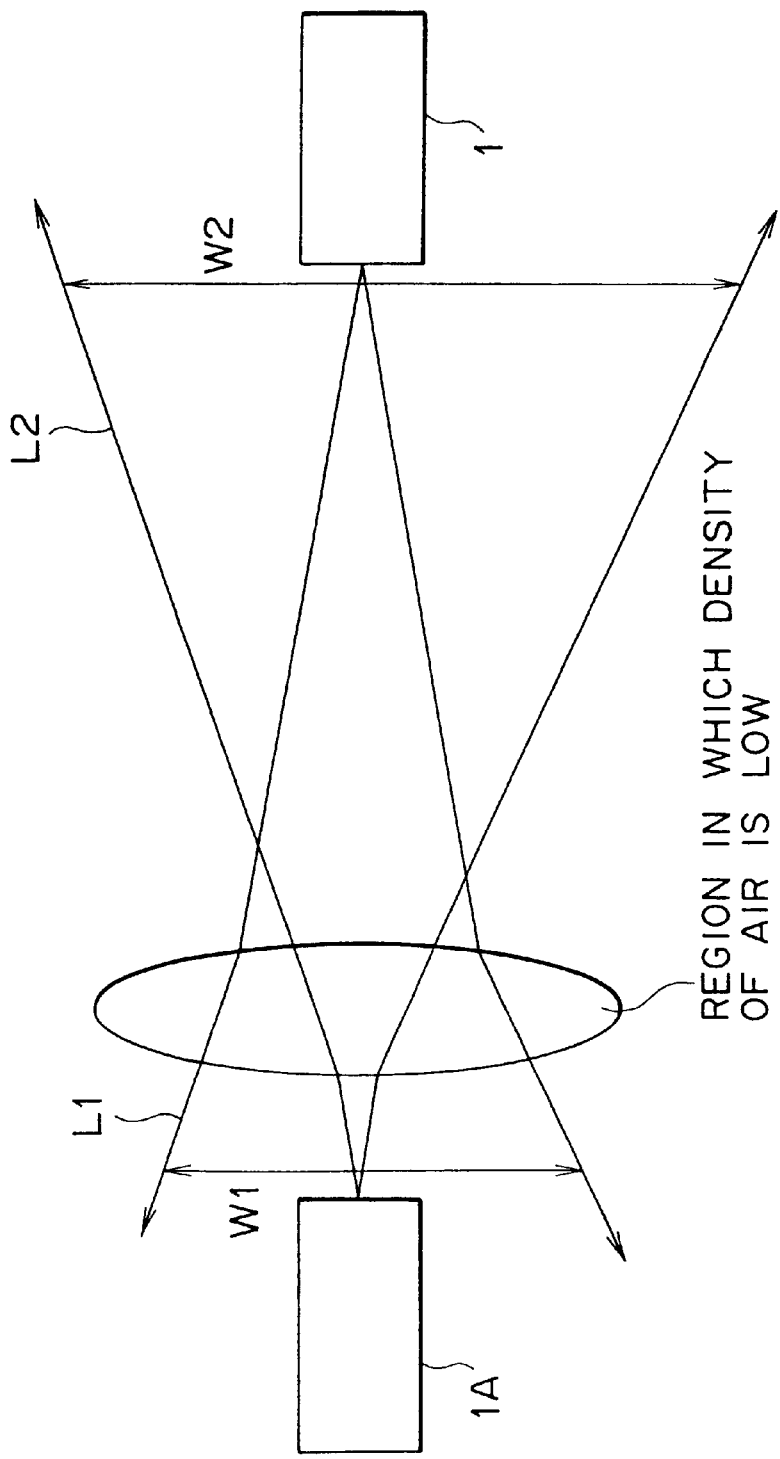
FIG. 12 is a diagrammatic view illustrating a condition of a transmission path.

In particular, as seen from FIG. 12, in a space transmission path interconnecting the optical space transmission apparatus 1 and 1A, the density of the air becomes non-uniform depending upon the lay of the land (a pond, a grassland, a road and so forth) along the space transmission path. When the light beams L1 and L2 emitted from the optical space transmission apparatus 1 and 1A pass, for example, a region having a higher density of the air than the other regions, which is caused in such a manner as described above, they are refracted by the region.

Even if the two light beams L1 and L2 are refracted by an equal degree to each other by the region, if the region is nearer to the optical space transmission apparatus 1A side, then the broadening degrees W1 and W2 of the light beams L1 and L2 are different at the optical space transmission apparatus 1 and 1A, respectively. Consequently, even where the condition of the transmission path is different between the optical space transmission apparatus 1 and the communication object apparatus, if the received light amount at the communication object apparatus is grasped and the light amount of the light beam is controlled by the transmission side as in the present embodiment, then the light amount of the light beam can be controlled appropriately and with certainty so that a desired information signal can be communicated with certainty.

In the control of the transmission light beam L1 by the optical space transmission apparatus 1, the light amount of the transmission light beam L1 is controlled within a range which does not exceed a predetermined upper limit value, and consequently, the laser diode 20 is protected. Further, the light amount of the transmission light beam L1 is controlled within a range which does not become lower than a predetermined lower limit value so that the transmission light beam L1 may be modulated within a range in which the linearity is high, and consequently, a high communication quality is assured.

Further, in the optical space transmission apparatus 1, the signal level of the carrier signal S2 to be used for modulation of the information signal S1 is controlled in a condition wherein the light amount of the transmission light beam L1 is set in this manner, and the modulation degree of the information signal S1 is switched. Consequently, even if the light amount of the transmission light beam L1 is switched, the modulation degree of the transmission light beam L1 is maintained at a fixed value, and the communication quality is maintained.

Further, as status data to be communicated between the optical space transmission apparatus 1 and the communication object apparatus in this manner, the inclination of the mirror 11 and the drive current of the laser diode 20 are communicated in addition to the received light amount between them. Consequently, for example, even if it is difficult to report the inclination of the mirror 11 and the drive current of the laser diode 20, the optical space transmission apparatus 1 can issue an electronic mail to report them to the communication object apparatus. Furthermore, where such status data are recorded, the history can be confirmed readily and can be utilized for maintenance.

1-3. Effects of the First Embodiment

With the optical space transmission apparatus having the construction described above, a light reception result of the light reception side of a light beam can be grasped and the light beam can be sent out with a suitable light amount from the transmission side by communicating status data which are information of an operation condition together with an information signal between the optical space transmission apparatus and the communication object apparatus, and consequently, the light beam can be emitted with an appropriate light amount from the laser diode and the burden to the laser diode can be moderated. As a result, the frequency of replacement of the light emitting element can be reduced with a simple construction.

2. Second Embodiment

FIG. 13 shows an optical space transmission apparatus according to a second embodiment of the present invention. Referring to FIG. 13, the optical space transmission apparatus denoted at 41 is similar in construction to the optical space transmission apparatus 1 of the first embodiment described hereinabove, and overlapping description of a common construction of it is omitted here to avoid redundancy.

In the optical space transmission apparatus 41, status data D1 and an information signal S1 are time division multiplexed by a multiplexer 42 and then modulated by a modulation circuit 43 to produce a drive signal for the laser diode 20. Consequently, the optical space transmission apparatus 41 transmits the status data in a time division multiplexed condition.

Further, in the optical space transmission apparatus 41, a result of demodulation by a demodulation circuit 44 is processed by a demultiplexer 45 to obtain status data D2 and an information signal S6 transmitted in a time division multiplexed condition from a communication object apparatus side similarly.

Also the optical space transmission apparatus 41 which transmits information of an operation condition in a time division multiplexed condition as described above can achieve similar advantages to those of the optical space transmission apparatus 1 described hereinabove.

3. Other Embodiments

It is to be noted that, while, in the embodiments described above, the drive current of a laser diode, a light reception result and the inclination of a mirror are transmitted as information of an operation condition, the present invention is not limited to this, and, for example, a bit error rate and so forth may be transmitted in addition to them.

While, in the embodiments described above, the amount of light received is detected directly and reported, the present invention is not limited to this, and various parameters which vary depending upon the received light amount may be reported instead so that the received light amount may be reported indirectly. Incidentally, in this instance, a gain of an AGC circuit provided in the signal processing circuit which processes a reception result or a bit rate may be reported.

Further, while, in the embodiments described above, an information signal in the form of an ethernet signal is communicated, the present invention is not limited to this, and the present invention can be applied widely to various information signals such as, for example, a video signal.

While preferred embodiments of the present invention have been described using specific terms, such description is for illustrative purposes only, and it is to be understood that changes and variations may be made without departing from the spirit or scope of the following claims.

What is claimed is:

1. An optical space transmission apparatus comprising:

a transmission means for sending out a transmission light beam modulated with a predetermined information signal to another optical space transmission apparatus disposed in a spaced relationship by a predetermined distance from said optical space transmission apparatus;

a reception means for receiving a transmission light beam sent out from said another optical space transmission apparatus in a spaced relationship by a predetermined distance from said optical space transmission apparatus as a reception light beam;

the transmission means further capable of transmitting information of an operation condition relating to reception of the reception light beam together with the information signal to said another optical space transmission apparatus; and a means for frequency multiplexing the information of the operation condition with the information signal, wherein the information of the operation condition at least includes information which directly or indirectly represents a received light amount of the reception light beam, information relating to a drive current of a laser diode associated with transmission means, and information relating to an inclination of a mirror associated with directing the transmitting light beam and the reception light beam.

2. An optical space transmission apparatus according to claim 1, further comprising means for varying, when the information of the operation condition which directly or indirectly represents the received light amount of the reception light beam, a light amount of the transmission light beam to be sent out in accordance with the information of the operation condition.

3. An information transmission method for an optical space transmission apparatus comprising the steps of:

sending out a transmission light beam modulated with a predetermined information signal to another optical space transmission apparatus disposed in a spaced relationship by a predetermined distance from said optical space transmission apparatus;

receiving a transmission light beam sent out from said another optical space transmission apparatus disposed in a spaced relationship by a predetermined distance from said optical space transmission apparatus as a reception light beam; and transmitting information of an operation condition relating to reception of the reception light beam frequency multiplexed together with the information signal to said another optical space transmission apparatus, wherein the information of the operation condition at least includes information which directly or indirectly represents a received light amount of the reception light beam, information relating to a drive current of a laser diode associated with sending out the transmission light beam and information relating to an inclination of a mirror associated with directing the transmission light beam and the reception light beam.

4. An information transmission method for an optical space transmission apparatus according to claim 3, wherein said receiving step of receiving a transmission light beam sent out from said another optical space transmission apparatus disposed in a spaced relationship by a predetermined distance from the optical space transmission apparatus as a reception light beam comprises the step of calculating a direct or indirect value of a received light amount from the received light amount itself of the reception light beam periodically or in response to a request from said another optical space transmission apparatus.

5. An information transmission method for an optical space transmission apparatus according to claim 3, wherein said sending step of sending out a transmission light beam modulated with a predetermined information signal to said another optical space transmission apparatus disposed in a spaced relationship by a predetermined distance from said optical space transmission apparatus as a reception light beam comprises the step of varying, when the information of the operation condition which directly or indirectly represents the received light amount of the reception light beam, a light amount of the transmission light beam to be sent out in accordance with said information of the operation condition.

6. An optical space transmission apparatus comprising:

a transmission means for sending out a transmission light beam modulated with a predetermined information signal to another optical space transmission apparatus disposed in a spaced relationship by a predetermined distance from said optical space transmission apparatus;

a reception means for receiving a transmission light beam sent out from said another optical space transmission apparatus in a spaced relationship by a predetermined distance from said optical space transmission apparatus as a reception light beam;

the transmission means further capable of transmitting information of an operation condition relating to reception of the reception light beam together with the information signal to said another optical space transmission apparatus; and a means for time division multiplexing the information of the operation condition with the information signal, wherein the information of the operation condition at least includes information which directly or indirectly represents a received light amount of the reception light beam, information relating to a drive current of a laser diode associated with transmission means, and information relating to an inclination of a mirror associated with directing the transmission light beam and the reception light beam.

7. An optical space transmission apparatus according to claim 6, wherein the information of the operation condition is information which directly or indirectly represents a received light amount of the reception light beam.

8. An optical space transmission apparatus according to claim 6, further comprising means for varying, when the information of the operation condition which directly or indirectly represents the received light amount of the reception light beam, a light amount of the transmission light beam to be sent out in accordance with the information of the operation condition.

9. An information transmission method for an optical space transmission apparatus comprising the steps of:

sending out a transmission light beam modulated with a predetermined information signal to another optical space transmission apparatus disposed in a spaced relationship by a predetermined distance from said optical space transmission apparatus;

receiving a transmission light beam sent out from said another optical space transmission apparatus disposed in a spaced relationship by a predetermined distance from said optical space transmission apparatus as a reception light beam; and transmitting information of an operation condition relating to reception of the reception light beam time division multiplexed together with the information signal to said another optical space transmission apparatus, wherein the information of the operation condition at least includes information which directly or indirectly represents a received light amount of the reception light beam, information relating to a drive current of a laser diode associated with sending out the transmission light beam, and information relating to an inclination of a mirror associated with directing the transmission light beam and the reception light beam.

10. An information transmission method for an optical space transmission apparatus according to claim 9, wherein said receiving step of receiving a transmission light beam sent out from said another optical space transmission apparatus disposed in a spaced relationship by a predetermined distance from the optical space transmission apparatus as a reception light beam comprises the step of calculating a direct or indirect value of a received light amount from the received light amount itself of the reception light beam periodically or in response to a request from said another optical space transmission apparatus.

11. An information transmission method for an optical space transmission apparatus according to claim 9, wherein said sending step of sending out a transmission light beam modulated with a predetermined information signal to said another optical space transmission apparatus disposed in a spaced relationship by a predetermined distance from said optical space transmission apparatus as a reception light beam comprises the step of varying, when the information of the operation condition which directly or indirectly represents the received light amount of the reception light beam, a light amount of the transmission light beam to be sent out in accordance with said information of the operation condition.

* * * * *